Patented Mar. 1, 1927.

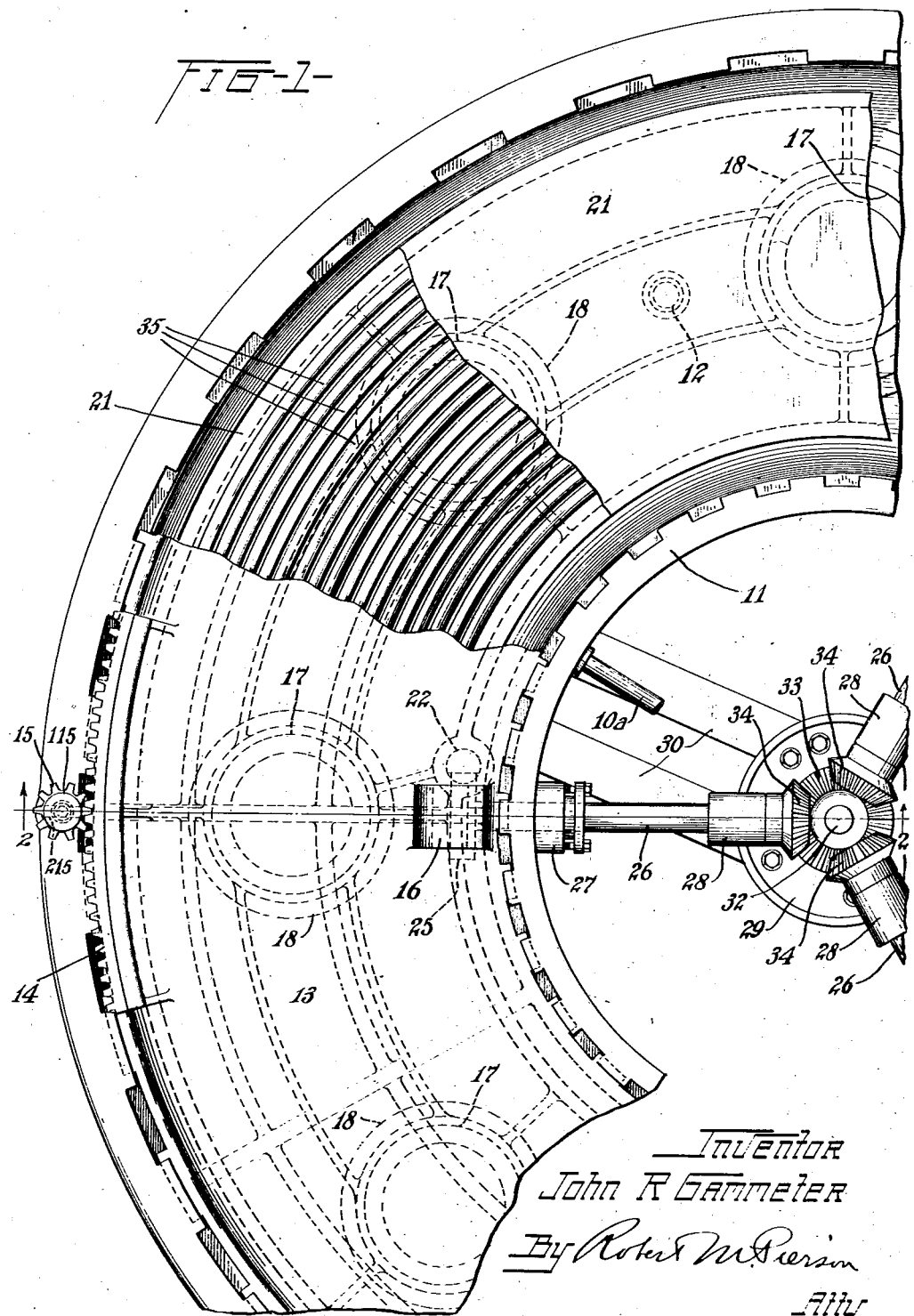

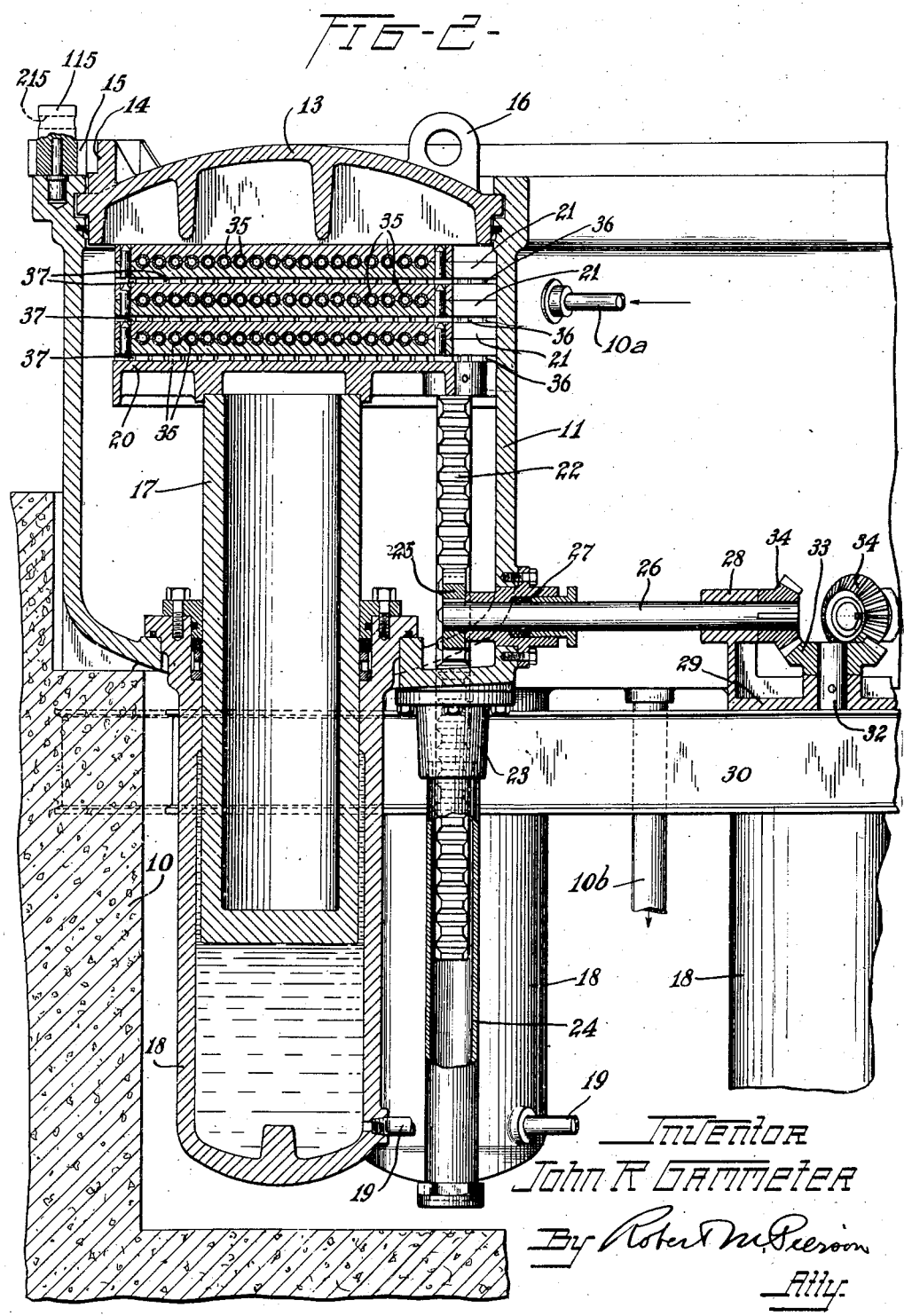

1,619,020

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

APPARATUS FOR VULCANIZING STRIP MATERIAL.

Application filed January 29, 1924. Serial No. 689,235.

This invention relates to vulcanizers and methods of vulcanizing such as are used in the rubber industry, and more particularly to the vulcanizing of molded rubber goods where pressure is applied to separable molds to hold their respective members in closed relation during the vulcanizing operation.

My invention is particularly applicable to the vulcanizing of strip material of long length, such as hose, which heretofore most commonly has been molded and vulcanized in a platen press adapted to vulcanize only a relatively short length of the hose or the like, the work being moved forward after each of a succession of vulcanizing operations so as to effect the vulcanization step by step. This method is not only slow, but results in non-uniform vulcanization in the finished article because of imperfect junction of the separately vulcanized zones. It heretofore has been proposed to vulcanize strip material such as hose by winding it upon a drum and molding it against the latter during vulcanization, but such procedure, for a given yardage of hose, requires a great deal of apparatus and an undue amount of time and labor for the operation thereof.

The chief object of my invention is to provide improved procedure and apparatus whereby articles of long length may be vulcanized simultaneously throughout their entire structure, and with economy of labor and equipment. Another object is to produce articles of uniform quality. Another object is to reduce the amount of time required for each vulcanizing operation, thereby permitting increased production without additional equipment.

Of the accompanying drawings:
Fig. 1 is a plan view of a portion of a vulcanizer embodying and adapted to carry out my invention in its preferred form, a part being broken away to show the work therein.
Fig. 2 is a section on the line 2—2 of Fig. 1.

Referring to the drawings, 10 is an annular foundation upon which is mounted a vulcanizer casing 11, enclosing an annular vulcanizing chamber, said casing being provided with a steam inlet 10ª, and a steam outlet and drain 10ᵇ, Fig. 2, and with an annular, interlocking cover 13 of the breechblock type, interlocking with both the inner and the outer wall of the casing 11. Said cover is formed on its outer periphery with a gear-segment 14 meshed with a drive pinion 15 mounted on the casing 11 and adapted to turn the cover 13 sufficiently to bring it to its locking and unlocking positions, said pinion having a hub 115 formed with a hole 215 to receive a turning bar. Apertured ears, one of which is shown at 16, are formed on the cover to facilitate the placing and removal of the latter.

A plurality of vertical, hydraulic rams or pistons 17, 17, extending through the floor of the annular vulcanizer, are positioned at equal distances from each other along the middle line of said floor, said rams working in respective cylinders 18, 18, sealed to and extending downward from said floor, each cylinder being provided at its lower end with a pipe 19 for the admission and discharge of water in the operation of the ram. Mounted upon the upper ends of the several rams 17 in common is an annular press platen 20, adapted to support a stack of annular, two part molds 21, 21, and hold the same closed by forcing the stack against the cover 13, the latter constituting the upper press platen.

To avoid tilting and straining of the platen 20, such as might result if the several rams 17 failed to operate uniformly, equalizing means are provided, comprising a plurality of circumferentially spaced, vertical racks, one of which is shown at 22, secured to said platen at its inner periphery. Each of said racks extends downward from said platen through an aperture in the floor of the vulcanizer casing, through an exterior guide sleeve 23 secured and sealed to said floor, and into a cylindrical pipe or housing 24 secured and sealed to said guide sleeve, the lower end of said pipe being sealed to prevent escape of heating fluid from the vulcanizer through the guide sleeve 23. Meshed with each of the racks 22, within the vulcanizer, is a drive pinion 25 secured on the end of a shaft 26, said shaft being disposed radially of the annular vulcanizer casing and extending through a stuffing box 27 in the inner side wall thereof. The several shafts 26 are mounted at their other ends, at the center of the space surrounded by the annular vulcanizer, in respective bearings 28, 28, formed on a central bracket 29, the latter being mounted upon a pair of beams 30, 30 embedded in and extending diametrically across the annular foundation 10, beneath the vulcanizer. Mounted centrally on the bracket 29, is a vertical stub shaft 32, and journaled on said stub-shaft is a bevel-gear 33, meshed with bevel-gears 34, 34, secured upon the adjacent ends of the respective radial shafts 26, the latter thus being compelled to rotate at the same speed, so as to maintain the platen 20 accurately in horizontal position as it is raised and lowered, notwithstanding such inequality as may occur in the forces directly applied to the platen by the several rams.

The sections of each of the annular, two part molds 21 are formed with complemental, registering, molding cavities or grooves of volute or spiral form, progressing in successive convolutions or loops from the inner to the outer periphery of the mold, as will be readily understood by reference to Fig. 1, where the spiral groove of one of the mold sections is occupied by a hose 35 constituting the work. The bottom surface of each mold is traversed by a series of radial grooves 36, 36, and an intersecting series of circumferential grooves 37, 37, so that steam injected into the vulcanizer will penetrate between the molds, resulting in a quicker and more uniform cure of the work therein.

In the operation of the apparatus, which in general will be understood from the foregoing description of structure, the work is coiled in the several molds, the latter mounted as shown in the drawings, and vulcanized by a heating fluid such as steam conducted into the vulcanizer casing 11, while the molds are held closed by the rams 17 and the equalizer device which includes the racks 22, etc.

Hollow strip material such as hose may be expanded against the mold during vulcanization, as by inserting a "blowing" material in the hose and closing the ends of the latter at the beginning of the vulcanizing operation, or by maintaining the interior of the hose in communication with a source of pressure-fluid supply during vulcanization.

After removal from the molds and while still warm, the work may be stretched and straightened so that no permanent deformation will result from the curvature of the mold cavity.

The vulcanizer, being annular, may be of such size as to avoid sharp curvature of the spiral strip of material being vulcanized, without the vulcanizing chamber being of such fluid capacity as to require an undue volume of heating fluid. A very long length of strip material may be uniformly vulcanized in a single operation, and the molds, the vulcanizer cover 13 and the platen 20 may be of light weight in proportion to the amount of strip material accommodated by the apparatus. The work being coiled approximately in a plane, molds of the simple, two part type may be used, with the advantage that the mold may be simply closed by the pressure of press platens, as distinguished from the vulcanizing of strip material wound on a drum, where at least a three part mold is required, with attendant disadvantages such as slow assembly and operation and small capacity for a given size of equipment.

Modifications may be resorted to without departing from the scope of my invention and I do not wholly limit my claims to the specific construction shown or the exact procedure described.

I claim:

1. Apparatus for vulcanizing strip material, said apparatus comprising a vulcanizer casing providing an annular vulcanizing chamber, an annular mold therein, means associated with said casing for holding said mold closed, and means for conducting a heating fluid into said chamber.

2. Apparatus for vulcanizing strip material, said apparatus comprising a vulcanizer casing providing an annular vulcanizing chamber, an annular mold therein formed with a spiral mold cavity disposed, in a plurality of convolutions, longitudinally of said annular mold, means associated with said casing for holding said mold closed, and means for conducting a heating fluid into said chamber.

3. Apparatus for vulcanizing strip material, said apparatus comprising a vulcanizer casing providing an annular vulcanizing chamber, an annular cover therefor adapted to serve as an upper press platen, an annular lower press platen in said chamber, and means associated with said casing for raising and lowering said lower press platen.

4. Apparatus for vulcanizing strip material, said apparatus comprising an annular mold of the two part type having a continuous mold cavity disposed, in successive convolutions, longitudinally of the annular mold, means including a set of fluid-operated rams annularly arranged for holding said mold closed, means for equalizing movements effected under the force of said rams, and means for heating the material in the mold.

5. A vulcanizing apparatus comprising a vulcanizing chamber and means for subjecting a plurality of molds therein to pressure including a movable platen, a plurality of spaced means for actuating said platen, and means for equalizing the movements of said platen under the force of said actuating means.

6. A vulcanizing apparatus comprising a vulcanizing chamber and means for subjecting a plurality of molds therein to pressure including a movable platen, spaced, fluid-operated rams adapted to actuate said platen, and means for equalizing the movements of said platen under the force of said rams.

7. Apparatus for vulcanizing strip material, said apparatus comprising a vulcanizing chamber, a cover therefor adapted to serve as an upper press-platen, a lower press-platen in said chamber, a set of spaced, fluid-operated rams adapted to raise and lower said lower press platen, and means for equalizing the movements of said platen under the force of said rams.

8. Apparatus for vulcanizing strip material, said apparatus comprising a vulcanizer casing enclosing an annular chamber, an annular cover therefor adapted to serve as an upper press platen, an annular, lower press platen in said casing, and a set of fluid-operated rams adapted to raise and lower said lower press platen.

9. Apparatus for vulcanizing strip material, said apparatus comprising a vulcanizer casing enclosing an annular chamber, an annular cover therefor adapted to serve as an upper press platen, an annular, lower press platen in said casing, a set of fluid-operated rams adapted to raise and lower said lower press platen, and means for equalizing the movement of said platen under the force of said rams.

10. Apparatus for vulcanizing strip material, said apparatus comprising a vulcanizer casing enclosing an annular chamber, an annular cover therefor adapted to serve as an upper press platen, an annular, lower press platen in said casing, a set of fluid-operated rams adapted to raise and lower said lower press platen, and means for equalizing the movement of said platen under the force of said rams, said equalizing means comprising a plurality of vertical racks secured to said platen, and gearing so connecting said racks as to compel them to move equally.

11. Apparatus for vulcanizing strip material, said apparatus comprising a vulcanizer casing enclosing an annular chamber, an annular cover therefor adapted to serve as an upper press platen, an annular, lower press platen in said casing, means for raising and lowering said lower press platen, and a plurality of annular mold members stacked on said lower press platen.

12. Apparatus for vulcanizing strip material, said apparatus comprising a vulcanizer casing enclosing an annular chamber, an annular cover therefor adapted to interlock with both the inner and outer side walls thereof by relative circumferential movement, an annular mold in said casing, and means for holding said mold closed by forcing it against said cover.

13. Vulcanizing apparatus comprising a vulcanizer casing enclosing an annular chamber, an annular cover therefor, adapted to serve as an upper press platen, a lower press platen in said casing, a plurality of vertical racks secured to and extending downwardly from said platen through apertures in the floor of said casing, sleeve-like closure means, into which said racks extend, sealed to said casing about the respective apertures in the floor of the latter, radial shafts traversing the inner wall of said casing adjacent the respective racks, pinions secured on the respective shafts and meshed with the respective racks and gearing operatively connecting the radially inner ends of the several shafts.

In witness whereof I have hereunto set my hand this 23rd day of January, 1924.

JOHN R. GAMMETER.